United States Patent [19]

Hammer et al.

[11] 4,002,712
[45] Jan. 11, 1977

[54] PROCESS FOR THE PRODUCTION OF A PLASTICIZED SHAPED BODY FROM A CELLULOSE DERIVATIVE

[75] Inventors: Klaus Dieter Hammer, Finthen; Wolfgang Klendauer, Wiesbaden, both of Germany

[73] Assignee: Hoechst Aktiengesellschaft, Germany

[22] Filed: Dec. 16, 1974

[21] Appl. No.: 533,452

[30] Foreign Application Priority Data

| Dec. 17, 1973 | Germany | 2362551 |
| Dec. 17, 1973 | Germany | 2362770 |
| Dec. 17, 1973 | Germany | 2362606 |
| Apr. 6, 1974 | Germany | 2416891 |
| Apr. 6, 1974 | Germany | 2416892 |

[52] U.S. Cl. ........................... 264/194; 106/164; 106/165; 106/176; 106/184; 264/195; 264/209

[51] Int. Cl.² .................................... D01F 2/08

[58] Field of Search .......... 264/191, 194, 195, 188, 264/209; 106/164, 165, 168, 176, 184, 186, 188; 260/248 NS

[56] References Cited

UNITED STATES PATENTS

| 2,322,981 | 6/1943 | Ubbelohde | 264/195 |
| 2,335,980 | 12/1943 | Wolfmann | 264/194 |
| 2,561,814 | 7/1951 | Novotny et al. | 264/88.7 B |
| 3,016,283 | 1/1962 | Schappel | 264/194 |
| 3,937,672 | 2/1976 | Busch et al. | 264/195 |

FOREIGN PATENTS OR APPLICATIONS

| 38-18568 | 9/1963 | Japan | 264/188 |
| 41-14609 | 8/1966 | Japan | 264/188 |
| 45-25851 | 8/1970 | Japan | 264/188 |
| 38-18565 | 9/1963 | Japan | 264/188 |
| 37-18319 | 6/1962 | Japan | 264/188 |
| 6,609,491 | 1/1967 | Netherlands | 264/188 |

OTHER PUBLICATIONS

"Cross–links of Cellulose Fibers," Kamiya et al., Seni Kogyo Shikensho Iho, No. 34, 45–33, (1956).

*Primary Examiner*—Jay H. Woo
*Attorney, Agent, or Firm*—James E. Bryan

[57] ABSTRACT

This invention relates to a process for the production of a shaped body from a cellulose derivative which comprises extruding a viscose solution through a shaping die into a precipitation bath and passing the shaped body thus formed through regenerating and washing baths, then treating the body with an acid aqueous solution of a secondary chemical plasticizer, drying it by heating, and finally moistening it with water after drying, said viscose solution being mixed with a liquid containing alkyl-trimethylol-urea of the following general formula

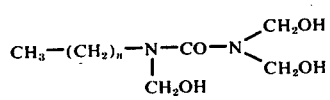

wherein n is a whole number between 9 and 24, preferably between 14 and 19, and especially the number 17, and/or with a liquid containing alkyl-ethylene-urea of the following general formula

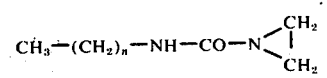

wherein n is a whole number between 11 and 19, preferably between 15 and 18, and especially the number 17, or with a liquid containing alkylamine-bis-dimethylene-triazinonetetramethylol of the following general formula wherein n is a whole number between 9 and 24, preferably between 14 and 19, and especially the number 17, or with a liquid containing alkylamide-bis-dimethylene-triazinonetetramethylol of the following general formula wherein n is a whole number between 9 and 24, preferably between 14 and 19, and especially the number 17.

43 Claims, 1 Drawing Figure

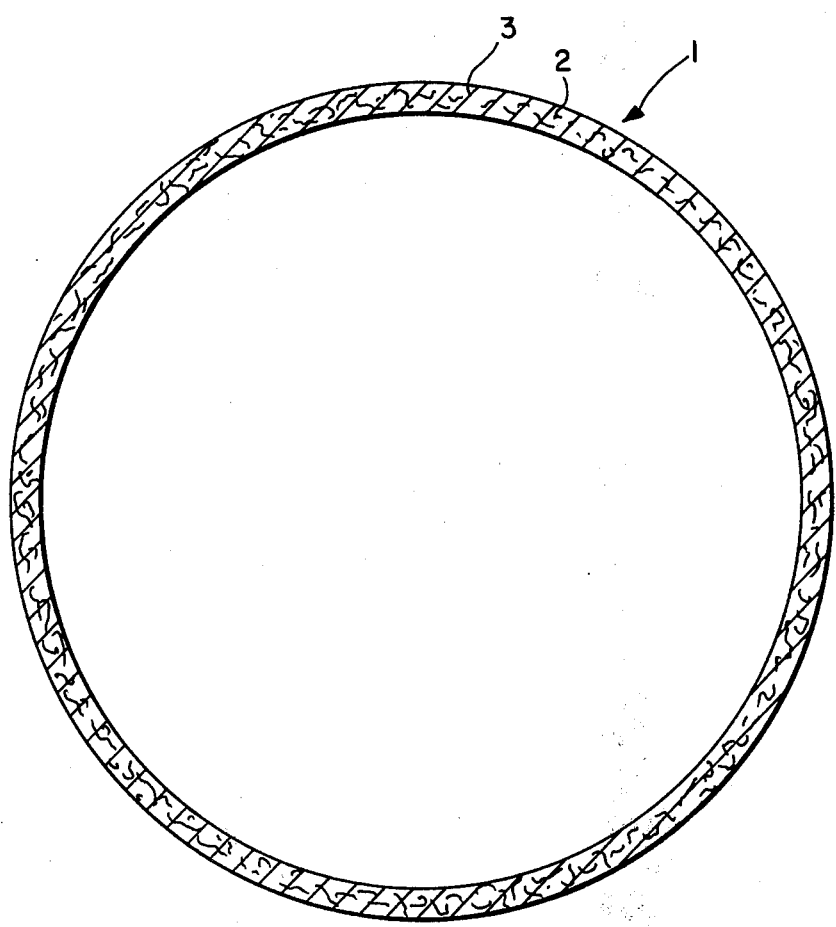

PROCESS FOR THE PRODUCTION OF A PLASTICIZED SHAPED BODY FROM A CELLULOSE DERIVATIVE

This invention relates to a process for the production of a plasticized shaped body from a cellulose derivative.

Further, the invention relates to a tube comprising a plasticized cellulose derivative, especially a tube for use as an artificial sausage casing.

It is known that shaped bodies made of cellulose hydrate become increasingly brittle and hard during storage.

This phenomenon is caused by a gradual crystallization process taking place in the cellulose hydrate body, by which hydrogen bridges are formed between the individual molecule chains in the cellulose hydrate structure which cause an approach of the chains and a fixation of their position.

Owing to this crystallization process and the structural changes going with it, certain physical properties of the shaped articles, especially their flexibility, strength and swelling value, are progressively reduced; further, it causes the shaped body to shrink.

Several processes have been proposed to couneract the progressive structural change occurring in shaped cellulose hydrate bodies and the disadvantageous embrittlement of the shaped body accompanying it.

Thus, it is known to pass shaped cellulose hydrate bodies during their manufacture through liquid baths containing plasticizers, such as glycerol, glycol, polyglycol and the like. By incorporating a plasticizer in the shaped body, its pliability and handling qualities are considerably improved, but on the other hand its strength values are reduced in an undesirable manner, especially when relatively large quantities of plasticizer are incorporated.

The plasticized shaped cellulose hydrate bodies manufactured by the known processes nevertheless become brittle during a relatively long period of storage, because the above-mentioned plasticizers tend to migrate from the shaped bodies. In the shaped articles manufactured according to known processes, the plasticizers are not linked to the cellulose hydrate molecules by a chemical bond, but only by intermolecular forces. For this reason, the above-named plasticizers are also called "secondary" plasticizers, and the materials plasticized thereby are referred to as "superficially" plasticized.

Further, it is known to treat shaped cellulose hydrate bodies containing secondary plasticizers with chemical comppound which, due to certain reactive groups, are capable of reaction with the hydroxyl groups of the cellulose molecules, thus cross-linking them. The cellulose hydrate bodies produced by this known process are distinguished by high strength values, but they have the disadvantage that, as a result of the cross-linking process, their elasticity is poor. Moreover, the crystallizing tendency is not satisfactorily prevented and the embrittlement of the shaped bodies is not sufficiently precluded.

Although by the action of the chemicals causing the cross-linking of the cellulose hydrate chains according to this known process smaller or larger proportions of the hydroxyl groups available for reaction in the cellulose molecule are chemically bonded - depending upon the quantity of cross-linking agent used - hydrogen bridges are still formed in the course of time between the non-bonded hydroxyl groups of the cellulose hydrate molecules, thus causing the shaped articles to become brittle. On the other hand, it is impossible to apply the cross-linking chemicals in such quantities that all hydroxyl groups of the cellulose hydrate molecules are blocked, because under these conditions completely useless, hard and brittle shaped bodies are produced. Furthermore, the known cross-linking processes have the disadvantage that the cross-linking substances are applied from the outside, as a solution, to the already shaped body. This method is disadvantageous not only because it requires an additional process step, but also because by this method first of all the cellulose hydrate molecules near the surface of the shaped body are cross-linked. Thus, cross-linking is not uniform over the entire cross-section of the shaped body; as a consequence, the shaped body is unduly cross-linked, and thus brittle, in the areas near its surface, whereas no, or substantially no, cross-linking occurs in the interior of the shaped body, so that the desired consolidation does not, or virtually does not, extend to these areas.

It is the object of the present invention to provide a process for the manufacture of a plasticized shaped body from a cellulose derivative, which does not have the disadvantages of the prior art processes and by means of which it is easily possible to manufacture from cellulose derivatives plasticized shaped bodies which do not become brittle, even after a relatively long storage, and which even after a relatively long time of storage or use have stretch and tear resistance values and swelling values which render them suitable for their intended use.

The term "shaped bodies" as used in connection with the present specification means filaments, films, and, in particular, tubes.

The invention relates further to a tubular artificial sausage casing based on a cellulose derivative, which is not only internally plasticized, but also contains a secondary plasticizer.

The terms "tube on the base of a cellulose derivative" or "tubular artificial sausage casing on the base of a cellulose derivative" as used in connection with the present invention also include fiber-reinforced tubes, especially paper fiber-reinforced tubes of cellulose derivatives.

The term "fiber-reinforced cellulose hydrate tubes", and more particularly "paper fiber-reinforced cellulose hydrate tubes" means cellulose tubes containing a fiber matrix and produced by impregnating tubes of fibrous material, especially of paper fibers, with cellulose derivatives and applying a layer of cellulose derivatives to their surfaces.

Films produced according to the inventive process may be used as packaging material, and filaments produced by the process may be worked into textile materials.

The object of the present invention is achieved by a process for the production of shaped bodies from cellulose derivatives in which a viscose solution is extruded through a shaping die into a precipitation bath, the resulting shaping body is passed through conventional regenerating and washing baths, then treated with an acid aqueous solution of a secondary chemical plasticizer, dried by heat action, and finally moistened with water after drying. In the process according to the invention a viscose solution is mixed with a liquid containing alkyltrimethylol-urea of the following general formula:

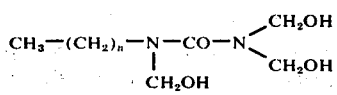

wherein *n* is a whole number between 9 and 24, preferably between 14 and 19, and especially the number 17, and/or with a liquid containing alkyl-ethylene urea of the following general formula

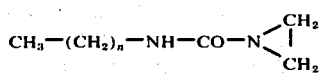

wherein *n* is a whole number between 11 and 19, preferably between 15 and 18, and especially the number 17, or with a liquid containing alkylamine-bis-dimethylene-triazinonetetramethylol of the following general formula

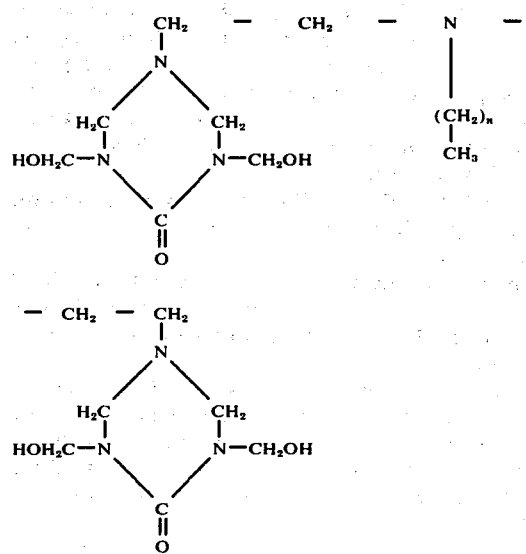

wherein *n* is a whole number between 9 and 24, preferably between 14 and 19, and especially the number 17, or with a liquid containing alkylamide-bis-dimethylene-triazinone tetramethylol of the following general formula

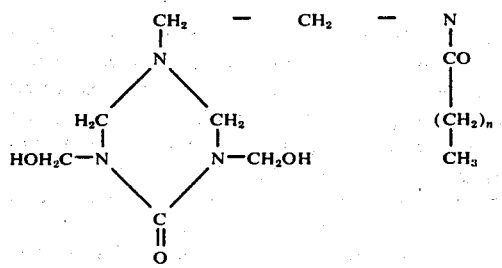

-continued

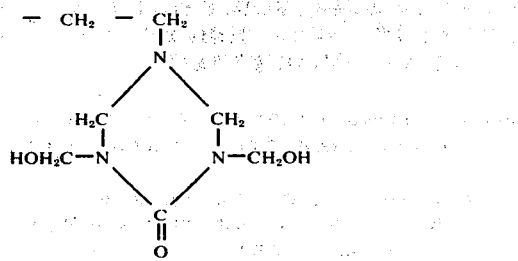

wherein *n* is a whole number between 9 and 24, preferably between 14 and 19, and especially the number 17, the resulting liquid mixture is extruded through a shaping die, into an acid aqueous precipitation bath, the shaped body thus formed is passed through several regenerating and washing baths, then treated with an acid aqueous solution of a secondary chemical plasticizer, then dried by heat action, and finaly moistened with water.

A further object of the present invention is a modified process for the manufacture of shaped bodies from cellulose derivatives, in which a viscose solution is extruded, through a shaping die, into a precipitation liquid, the resulting shaped body is passed through the conventional regenerating and washing baths, then dried by heat action, and moistened with water after drying, in which modified process a viscose solution is mixed with a liquid containing alkyl-trimethylol-urea of the following general formula

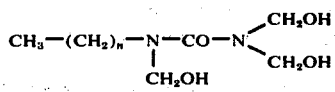

wherein *n* is a whole number between 9 and 24, preferably between 14 and 19, and especially the number 17, and/or with a liquid containing alkyl-ethylene urea of the following general formula

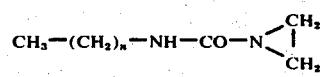

wherein *n* is a whole number between 11 and 19, preferably between 15 and 18, and especially the number 17, or with a liquid containing alkylamine-bis-dimethylene-triazinonetetramethylol of the following general formula

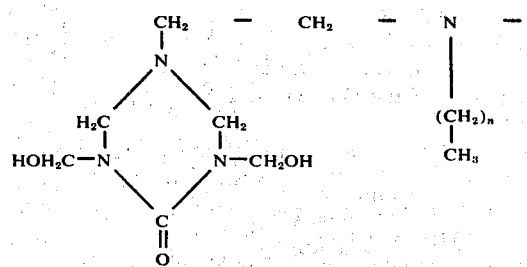

-continued

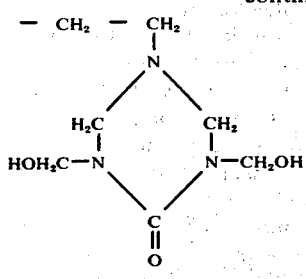

wherein *n* is a whole number between 9 and 24, preferably between 14 and 19, and especially the number 17, or with a liquid containing alkylamide-bis-dimethylene-triazinonetetramethylol of the following general formula

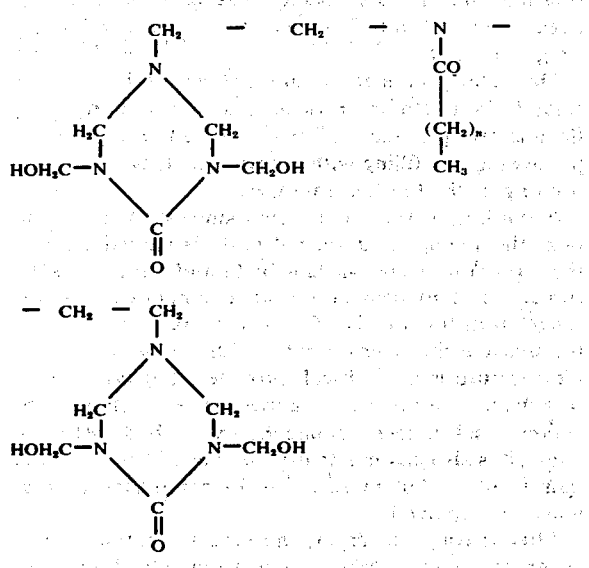

wherein *n* is a whole number between 9 and 24, preferably between 14 and 19, and especially the number 17, the resulting liquid mixture is extruded through a shaping die into an acid aqueous precipitation bath, the shaped body thus formed is passed through several regenerating and washing baths, then dried by heat action, and finally moistened with water.

The term "viscose solution" means a liquid which comprises cellulose xanthogenate dissolved in an about 7% sodium hydroxde solution, has a γ-value in the range from 25 to 35, and contains about 82 to 83 per cent by weight of water, 7 to 8 per cent by weight of cellulose, 5.5 to 7 per cent by weight of pure NaOH, linked to cellulose, and 2.5 per cent by weight of sulfur, also linked to cellulose. Viscose solutions of this type are known and are no part of the present invention.

Alkyl-trimetylol-urea and/or alkyl-ethylene-urea, alkylamine-bis-dimethylene-triazinone-tetramethylol or alkylamide-bis-dimethylene-traizinone-tetramethylol serve to cross-link the cellulose molecules in the process of the invention and at the same time plasticize the shaped body. The capability of cross-linking cellulose molecules is based on the chemical bis-functionality of the alkyl-trimethylol-urea and/or alkyl-ethylene-urea, alkylamine-bis-dimethylene-triazinone-tetramethylol or alkylamide-bis-dimethylene-triazinone-tetramethylol, whose reactive methylol groups are capable of undergoing a chemical reaction with the hydroxyl groups of the cellulose molecules by which these are cross-linked.

The plasticizing effect of the above-mentioned chemical compounds, which are firmly incorporated by covalent bonds in the cellulose structure of the shaped body by the aforementioned reaction so that cellulose chains are cross-linked, is due to their three-dimensional structure and the length of their alkyl groups.

The plasticizing of the shaped cellulose bodies by alkyl-trimethylol-urea and/or alkyl-ethylene-urea, alkylamine-bis-dimethylene-triazinone-tetramethylol or alkylamide-bis-dimethylene-triazinone-tetramethylol firmly linked, by a chemical reaction, to the cellulose molecules forming the shaped body will be designated in connection with the present invention as "internal" plasticizing of the shaped body. Consequently, alkyl-ethylene-urea, alkyl-trimethylol urea, alkylamine-bis-dimethylene-triazinone-tetramethylol and alkylamide-bis-dimethylene-triazinone-tetramethylol will be regarded as "internal" or "primary" plasticizers.

The term "cellulose derivatives" as used in connection with the present description means cellulose hydrate as well as the compounds formed by a chemical reaction between the reactive methylol groups of alkyl-trimethylol-urea and/or alkyl-ethylene-urea, alkylamine-bis-dimethylene-triazinone-tetramethylol or alkylamide-bis-dimethylene-triazinone-tetramethylol and the reactive OH groups of cellulose molecules. The liquid containing alkyl-trimethylol urea and/or alkyl-ethylene-urea, alkylamine-bis-dimethylene-triazinone-tetramethylol or alkylamide-bis-dimethylene-triazinone-tetramethylol preferably is a dispersion, in particular an aqueous dispersion of alkyl-trimethylol urea and/or alkyl-ethylene-urea, alkylamine-bis-dimethylene-triazinone tetramethylol, or alkylamide-bis-dimethylene-triazinone-tetramethylol. Preferably, the liquid contains the above-mentioned chemical compounds in dispersed form, most advantageously dispersed in water, the quantities of the compounds ranging from 10 to 30 per cent by weight, quantities in the range between 20 and 25 per cent by weight, calculated on the total weight of the liquid, being preferred.

Alternatively, the liquid contaning alkyl-trimethylol-urea and/or alkylethylene-urea, alkylamine-bis-dimethylene-triazinone-tetramethylol or alkylamide-bis-dimethylene-triazinone-tetramethylol may be composed of a solution or dispersion of the chemical substance in an appropriate organic solvent. The solvent or dispersing agent also may comprise a mixture of water and organic solvents, e.g. ethanol, butanol, propanol or isopropanol.

The liquid mixture is prepared by mixing, with agitation, a viscose solution with such a quantity of the liquid containing alkylamine-bis-dimethylene-triazinone-tetramethylol or alkylamide-bis-dimethylene-triazinone-tetramethylol, or alkyl-trimethylol-urea and/or alkylethylene urea, preferably an aqueous solution of these substances, that the liquid mixture contains a proportion between 0.5 and 40 per cent by weight, preferably between 1 and 15 per cent by weight, of alkylamine-bis-dimethylene-triazinone-tetramethylol or alkylamide-bis-dimethylene-triazinone-tetramethylol, alkyl-trimethylol-urea and/or alkyl-ethylene-urea, calculated on the proportion (by weight) of cellulose contained in the liquid mixture.

In the preparation of the aqueous dispersions containing the above-mentioned chemicals, known dispersing adjuvants, e.g. alkyl, aryl or alkylaryl sulfonates or sulfates, are added in quantities from 1 to 5 per cent by weight, calculated on the quantity of dispersed substance. The dispersing adjuvants contribute to the uniform distribution of alkyl-trimethylol-urea and/or alkylethylene urea, or alkylamine-bis-dimethylene-triazinone-tetramethylol or alkylamide-bis-dimethylene-triazinone-tetramethylol in the liquid mixture.

The process will now be described, as an example, by reference to the manufacture of a tube. Films and filaments are produced in fundamentally the same manner, using appropriately shaped dies known for these purposes. In the process, a viscose solution is mixed, with stirring, with the liquid containing alkyl-trimethylol-urea and/or alkyl-ethylene-urea, alkylamine-bis-dimethylene-triazinone-tetramethylol, or alkylamide-bis-dimethylene-triazinone-tetramethylol. Preferably, an appropriate quantity of the solution containing alkyl-trimethylol-urea and/or alkyl-ethylene-urea, alkylamine-bis-dimethylene-triazinone-tetramethylol or alkylamide-bis-dimethylene-triazinone-tetramethylol is added to the viscose solution with agitation.

The resulting liquid mixture is then extruded through a shaping die, in the case of a tube through an annular die, into a known acid aqueous precipitation bath. The precipitation liquid is known in the art by the name of "Müller Bath"; it is composed of an aqueous solution of $H_2SO_4$ and $Na_2SO_4$. Preferably, the aqueous liquid contains 10 per cent by weight of sulfuric acid and 14 per cent by weight of sodium sulfate, calculated on its total weight.

The precipitation bath has a pH value less than 7 and preferably is in the range from 1 to 3.

By catalytic action, especially the subsequent heat treatment of the shaped body, the acidity of the precipitation liquid penetrating into the structure of the shaped body accelerates the cross-linking reaction between alkyl-trimethylol-urea and/or alkyl-ethylene-urea, alkylamine-bis-dimethylene-triazinone-tetramethylol or alkylamide-bis-dimethylene-triazinone-tetramethylol and the hydroxyl groups of the cellulose molecules.

The shaped body precipitated in the form of a tube is then passed in known manner through a number of known regenerating and washing baths. The regenerating baths are composed of aqueous solutions of sulfuric acid and sodium sulfate in specific proportions, the successive individual baths being distinguished from ach other in that they contain different proportions of sulfuric acid and sodium sulfate. The present invention does not concern these baths or their composition.

Then, the tube is subjected to the action of an acid aqueous solution of a secondary plasticizer, for example by passing the tube through a trough filled with this liquid. Suitable secondary plasticizers are glycerol, glycol, or polyglycol, for example. The plasticizer bath contains from 5 to 20 per cent by weight of secondary plasticizer, preferably from 10 to 15 per cent by weight, based on the total weight of the liquid. After this treatment, the tube contains secondary plasticizers in the form of the above-mentioned chemicals in a proportion between 18 and 25 per cent by weight, based on the total weight of the tube.

Such "secondary" plasticizers are capable of plasticizing, i.e. softening, the polymer materials to which they are added. In shaped articles of polymer materials containing such secondary plasticizers, the plasticizer is not linked to the polymer chains by a covalent bond, but is attached to or between the polymer chains only by the action of intermolecular forces.

The tube is then dried by exposing it to heat action at temperatures between 90° and 120° C, for example by passing it through a drying oven operated with hot air. The drying temperature employed is not critical, provided it is not so high that the heat action causes a thermal destruction of the chemical substances forming the shaped body; alternatively, it is also possible to dry the shaped body at temperatures below 90° C, but in this case longer drying periods must be employed.

After leaving the drier, the tube is contacted with water, for example sprayed with water. The duration of action on the shaped body and the quantity of water used are determined such that after the water treatment the tube contains between about 7 and 22 per cent by weight, preferably about 16 per cent by weight of water, calculated on the total weight of the tube. The finished tube has a secondary plasticizer content between about 18 and 25 per cent by weight, based on the weight of the tube.

The tube produced in this manner is particularly suitable for use as an artificial sausage casing. It is very flexible and thus can be easily handled during further processing, i.e. filling with sausage meat, tying off, and printing of the finished sausages.

According to the second embodiment of the invention, the precipitated shaped body is passed through the regenerating and washing baths and is then dried by subjecting it to heat action at a temperature in the range from 90° to 120° C, for example by passing it through a drying oven operated with hot air. The drying temperature is not critical, provided it is not so high that the heat action causes a thermal destruction of the chemical substances forming the shaped body. Alternatively, it is also possible to dry the shaped body at lower temperatures, but in this case longer drying periods must be employed.

After leaving the dryer, the tube is contacted with water, for example sprayed with water. The duration of action on the shaped body and the quantity of water used are determined such that after the water treatment the tube contains between about 7 and 22 per cent by weight, preferably about 16 per cent by weight of water, based on its total weight.

A tube produced in this manner may be used as described above.

The process of the invention also may be performed by using, as the liquid mixture, a mixture of alkyl-trimethylol-urea, alkyl-ethylene-urea, alkylamine-bis-dimethylene-triazinone-tetramethylol, and alkylamide-bis-dimethylene-triazinone-tetramethylol in any desired combination.

A fiber-reinforced tube based on a cellulose derivative, which is especially suitable for use as an artificial sausage casing, is prepared in a very similar manner, for example a tube of cellulose fibers is impregnated and coated in a manner known per se and by means of known apparatuses with the above-described liquid mixture, the tube is then passed in the manner described above to the aqueous precipitation bath, regenerated and washed, subjected to the action of the plasticizing liquid, dried, and finally sprayed with water, or, according to the second modification of the invention, the tube is dried immediately after precipitation and washing.

Impregnation and coating of the tube are effected by means of an appropriate annular die known for this purpose. While the fibrous tube is passed through the annular slot of the die, the liquid mixture is applied to its surface through appropriately disposed slots in the annular die channel, so that the tube is simultaneously impregnated and coated.

The present invention is further concerned with a plasticized shaped body based on a cellulose derivative, especially a tube for use as an artificial sausage casing, which is composed of cellulose hydrate and reaction products formed by a chemical reaction of cellulose molecules containing reactive OH groups with alkyl-trimethylol-urea of the general formula

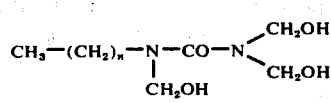

wherein $n$ is a whole number between 9 and 24, preferably between 14 and 19, and especially the number 17, and/or with alkyl-ethylene-urea of the general formula

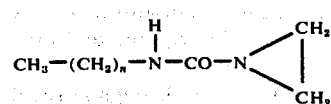

wherein $n$ is a whole number between 11 and 19, preferably between 15 and 18, and especially the number 17, or with alkylamine-bis-dimethylene-triazinone-tetramethylol of the general formula

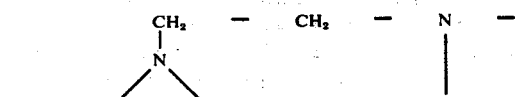
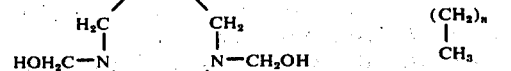

wherein $n$ is a whole number between 9 and 24, preferably between 14 and 19, and especially the number 17, or with alkylamide-bis-dimethylene-triazinone-tetramethylol of the general formula

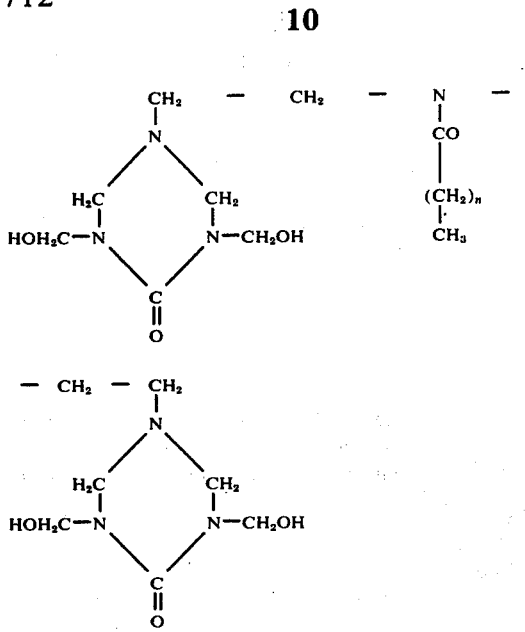

wherein $n$ is a whole number between 9 and 24, preferably between 14 and 19, and especially the number 17, and contains a secondary plasticizer.

A modification of the present invention is concerned with a shaped body based on plasticized cellulose hydrate, especially a tube for use as an artificial sausage casing, which is composed of cellulose hydrate and reaction products formed by a chemical reaction of cellulose molecules containing reaction OH groups with alkyl-trimethylol-urea of the general formula

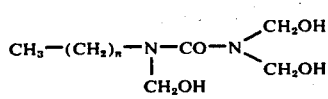

wherein $n$ is a whole number between 9 and 24, preferably between 14 and 19, and especially the number 17, and/or with alkyl-ethylene urea of the general formula

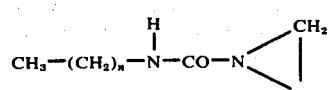

wherein $n$ is a whole number between 11 and 19, preferably between 15 and 17, and especially the number 17, or with alkylamine-bis-dimethylene-triazinone-tetramethylol of the general formula

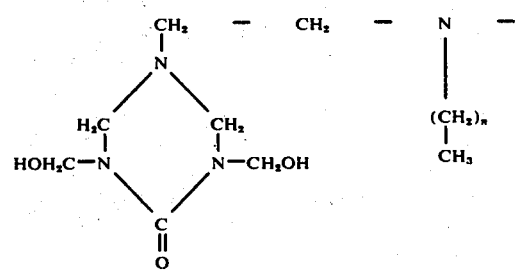

-continued

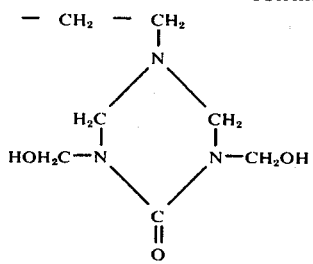

wherein n is a whole number between 9 and 24, preferably between 14 and 19, and especially the number 17, or with alkylamide-bis-dimethylene-triazinone-tetramethylol of the general formula

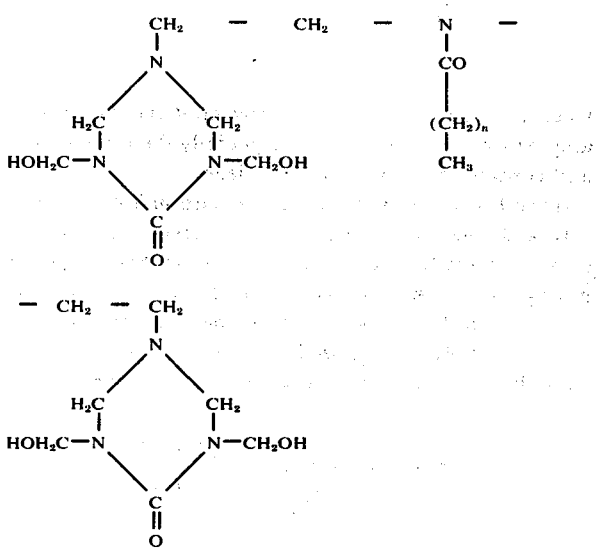

wherein n is a whole number between 9 and 24, preferably between 14 and 19, and especially the number 17.

The interior plasticizing of the cellulose hydrate is caused by alkyl-trimethylol-urea and/or alkyl-ethylene-urea, alkylamine-bis-dimethylene-triazinone-tetramethylol, or alkylamide-bis-dimethylene-triazinone tetramethylol linked to cellulose hydrate molecules by covalent bonds.

As compared with those prepared in accordance with known processes and containing only secondary plasticizers in a proportion between 18 and 25 per cent by weight incorporated therein, the shaped bodies of the present invention have the advantage that their strength is considerably greater, their swelling values are lower, and their elasticity is substantially the same as that of known materials, and these characteristics do not undergo any adverse changes even during a prolonged storage of the shaped bodies according to the invention.

The swelling value of a tube or film is measured by a method which is described in "Färberei- und textiltechnische Untersuchungen" (Research in Dyeing and Textile Techniques) by Hermann-Agster, Springer-Verlag, 1956, page 400, or in the publication "Zellcheming-Merkblatt IV/33/57".

In connection with the present invention, a shaped body, in particular a cellulose tube or film, is designated as being in the "gel state", when it contains from 300 to 330 per cent (swelling value or degree) of swelling agent (normally water), calculated on the total weight of the shaped body.

The invention will be further illustrated by reference to the following specific examples:

EXAMPLE 1

14.6 g (5% based on the cellulose proportion) of a 24 per cent by weight aqueous emulsion of stearylamine bisdimethylene triazinone tetramethylol are added to 1 kg of viscose having a cellulose content of 7.1 per cent by weight, based on the total weight of the solution, an alkali content of 5.78, a γ-value of 32.8, a sodium chloride ripeness of 3.25 and a viscosity of 123 falling-ball seconds at 25° C. The percentage by weight is based on the proportion of dispersed substance of the dispersion.

The liquid mixture is then pressed through an annular slot die having an external diameter of 18 mm, a process during which it forms a tubular body, into a precipitating liquid which is composed of an aqueous solution containing 10 per cent by weight of sulfuric acid and 14 per cent by weight of sodium sulfate, both figures being based on the total weight of the solution.

Then, the tube is passed through several regenerating baths in succession, the composition of which is known and explained in the description, and through a washing liquid, such as water.

Then, the tube is passed through a trough containing an aqueous 11 per cent by weight glycerin solution which has been adjusted to a pH-value of 2.5 by adding a suitable quantity of sulfuric acid.

The duration of action of the aqueous solution containing a secondary plasticizer on the tube is calculated in such a manner that the final product contains a glycerin proportion of about 19 per cent by weight based on the total weight of the tube.

After being treated with a plasticizer solution the tube is dried. For this purpose the tube is passed, in its inflated state and at a speed of about 20 m per minute, through a drier having a length of 50 m, a process during which the temperature in the entrance of the drier is about 90° C and at the end of it 120° C.

After leaving the drier the tube is sprayed with water. The duration of spraying and its intensity are calculated in such a manner that the tube has, after the treatment, a water content of about 16%, based on the total weight of the tube.

The tube produced according to the invention is very flexible and has a water-repellent surface (wetting angle 90° C).

The tube is particularly suitable for use as an artificial sausage casing. If used for this purpose, it easily can be shirred to form a stick which is then filled with sausage meat to make sausages. As an artificial sausage casing, the tube produced according to the invention has the advantage that it easily can be removed from the sausage meat.

The table below gives the data of the tube produced according to Example 1 with regard to a tube which was produced with a conventional viscose solution (Example 1, but without adding the stearylamine bisdimethylene triazinone tetramethylol emulsion to the viscose solution.

| Properties | | Tube produced under the conditions described in Example 1 (process according to the invention) | | Tube produced under the conditions described in Example 1, but without adding a stearylamine bis-dimethylene triazinone tetramethylol emulsion to the viscose solution (known process) | |
|---|---|---|---|---|---|
| | | Figures immediately after production | Figures after 8 months | Figures immediately after production | Figures after 8 months |
| Wall thickness | μ | 30 | 30 | 30 | 30 |
| bursting pressure | m of water column | 6.5 | 6.7 | 5.0 | 5.7 |
| expansion at break | % | 33.8 | 30.4 | 36.2 | 36.7 |
| elongation at rupture, longitudinal | % | 38 | 34 | 45 | 38 |
| elongation at rupture, transverse | % | 100 | 92 | 104 | 80 |
| alternating bending figure | | 7217 | 7200 | 5622 | 6535 |

EXAMPLE 2

7.3 g (2.5%, based on the cellulose proportion of the viscose) of a 24 per cent by weight aqueous stearylamine bis-dimethylene triazinone tetramethylol emulsion are mixed with 1 kg of viscose (having the same characteristic data as given in Example 1). The percentage by weight is based on the proportion of dispersed substance of the total weight of the aqueous emulsion.

The liquid mixture is then further treated as described in Example 1. The tube produced according to the example thus contains, because of the effect of the solution containing a secondary plasticizer on the tube and on the water treatment, a water proportion of about 16 per cent by weight and a glycerin proportion of about 19 per cent by weight, both figures based on the total weight of the finished tube.

The table below gives the characteristic data of a tube produced according to Example 2. For reasons of comparison the characteristic data of another tube are given which was produced under the conditions given in Example 2, with the exception, however, that no stearylamine bis-dimethylene triazinone tetramethylol dispersion was added to the viscose solution. The second tube thus corresponds to a plasticized tube on the basis of cellulose hydrate which was produced in known manner.

| Properties | | Tube produced according to Example 2 | | comparison tube | |
|---|---|---|---|---|---|
| | | Figures immediately after production | Figures after 8 months | Figures immediately after production | Figures after 8 months |
| Wall thickness | μ | 30 | 30 | 30 | 30 |
| bursting pressure | m of wat. col. | 4.0 | 4.4 | 4.6 | 4.8 |
| expansion at break | % | 42.9 | 32.9 | 31.0 | 25.0 |
| rupture length, longitudinal | m | 4500 | 4350 | 4250 | 3850 |
| rupture length, transverse | m | 3075 | 3150 | 3650 | 2775 |
| elongation at rupture longitudinal | % | 42 | 42 | 44 | 36 |
| elongation at rupture transverse | % | 70 | 68 | 72 | 50 |
| alternating bending figure | | 5341 | 6960 | 5381 | 6221 |
| swelling value | % | 118 | | 126 | |

EXAMPLE 3

42 g (12 percent by weight, based on the cellulose proportion of the viscose) of a 20 percent by weight aqueous stearyl trimethylol urea dispersion are, during stirring, added to 1 kg of viscose (having the characteristic data given in Example 1). Then the liquid mixture is degassed.

The liquid is then further used as described in Example 1. The tube produced according to Example 3 contains 16 percent by weight of water as well as 19 percent by weight of glycerin, both figures being based on the total weight of the tube.

The tube produced according to the invention is very flexible; it has a wetting angle for water of 120°.

The table below gives the characteristic data of a tube produced according to Example 3. For reasons of comparison, the characteristic data of another tube are given which was produced under the conditions given in Example 3, with the exception, however, that no stearylamine bis-dimethylene tetramethylol urea dispersion was added to the viscose solution. The second tube thus corresponds to a plasticized tube on the basis of cellulose hydrate which was produced in known manner.

| Properties | | tube produced according to Example 3 | comparison tube |
| --- | --- | --- | --- |
| Wall thickness | $\mu$ | 30 | 30 |
| bursting pressure | m of water column | 6.8 | 4.2 |
| expansion at break | % | 58 | 46 |
| rupture length, longitudinal | m | 5250 | 4700 |
| rupture length, transverse | m | 3600 | 3100 |
| elongation at break, longitudinal | % | 50 | 42 |
| elongation at break, transverse | % | 86 | 80 |
| alternating bending figure | | 9200 | 6000 |
| weight per m² g | | 41 | 41 |
| immediate swelling value | % | 118 | 142 |
| swelling value after three weeks | % | 118 | 126 |

The swelling value, the figures for shrinking, expansion and strength of the tube described above do not change, even after it has been stored for a longer period of time.

EXAMPLE 4

14.6 g (5 percent by weight, based on the cellulose proportion of the viscose) of an aqueous 24 percent by weight stearylamine bis-dimethylene triazinone tetramethylol dispersion, containing dyestuff, are, during stirring, added to 1 kg of viscose having the characteristic data as given in Example 1. The dyed liquid mixture is then used for the impregnating and coating of a tube composed of paper fibers. For this purpose a known die having an annular slot is used, through which the paper fiber tube is continuously passed, while at the same time the liquid mixture is caused to act upon its outer and/or inner surface. Due to this step paper fiber tube is produced which is impregnated with the liquid mixture and which has a layer of this liquid mixture on its surface.

This tube is further treated in the same way as the liquid mixture leaving the annular slot die according to Example 1.

The tube produced according to Example 4 contains a water proportion of 10 percent by weight as well as 22 percent by weight of glycerin, both figures based on the total weight of the tube.

The table below gives the characteristic data of a tube produced according to Example 4. For reasons of comparison the characteristic data of another tube are given, which was produced under the conditions given in Example 4, with the exception, however, that no stearylamine bis-dimethylene triazinone tetramethylol dispersion was added to the viscose solution. The second tube thus corresponds to a plasticized tube on the basis of cellulose hydrate which was produced in known manner.

| Properties | | tube produced according to Example 4 | comparison tube |
| --- | --- | --- | --- |
| Wall thickness | $\mu$ | 100 | 100 |
| rupture length, longitudinal | m | 3250 | 3025 |
| rupture length, transverse | m | 2900 | 2875 |
| elongation at rupture longitudinal | % | 29 | 28 |
| elongation at rupture transverse | % | 32 | 31 |
| bursting pressure | m of water column | 10.8 | 10.8 |
| swelling value, immediate | % | 132.5 | 119.3 |
| swelling value after 7 months | % | 124.6 | 118.9 |

EXAMPLE 5

The process is the same as in Example 4, with the exception however, that 29.2 g (10 percent by weight, based on the cellulose proportion of the viscose) of a 24 percent by weight aqueous stearylamine bis-dimethylene triazinone tetramethylol dispersion are added to the viscose.

The other conditions are the same as those given in Example 4.

The tube produced is shirred in the known manner in a shirring apparatus so as to form a tube stick.

The following table gives the characteristic data of a tube produced according to Example 5. For reasons of comparison the characteristic data of another tube are given which was produced under the conditions given in Example 5, with the exception however, that no stearylamine bis-dimethylene triazinone tetramethylol dispersion was added to the viscose solution. The second tube thus corresponds to a plasticized tube on the basis of cellulose hydrate which was produced in known manner.

| Properties | | tube produced according to Example 5 | | comparison tube |
| --- | --- | --- | --- | --- |
| | | 5% | 10% | |
| Wall thickness | $\mu$ | 100 | 100 | 100 |
| rupture length, longitudinal | m | 3300 | 3150 | 3200 |

| Properties | | tube produced according to Example 5 | | comparison tube |
| --- | --- | --- | --- | --- |
| | | 5% | 10% | |
| rupture length, transverse | m | 2900 | 2750 | 2925 |
| elongation at rupture, longitudinal | % | 27 | 29 | 30 |
| elongation at rupture, transverse | % | 36 | 46 | 38 |
| bursting pressure, m of water column | | 7.6 | 7.8 | 7.9 |
| swelling value | % | 116 | 108 | 132 |
| expansion at break | % | 4.35 | 9.40 | 3.19 |

The effect of the different quantities of cross-linking agent in Examples 4 and 5 can be distinctly recognized from the increase in expansion at break.

EXAMPLE 6

35 g (10 percent by weight, based on the cellulose proportion of the viscose) of an aqueous 20 percent by weight stearyl trimethylol urea dispersion are, during stirring, added to 1 kg of viscose having a cellulose content of 7 percent by weight, based on the total weight of the viscose solution, an alkali content of 5.8, a γ-value of 29.4, a sodium chloride ripeness of 2.5 and a viscosity of 140 falling-ball seconds at 25° C. The liquid mixture is then used for the impregnating and coating of a tube composed of paper fibers. For this purpose a known coating die having an annular slot (inner diameter of the die is 60 mm) is used through which the paper fiber tube is continuously passed, while at the same time the liquid mixture is caused to act upon its outer and/or inner surface. Due to this step a paper fiber tube is produced which is impregnated with the liquid mixture and which has on its surface a layer of the liquid mixture.

The tube is further treated in the same way as the liquid mixture leaving the annular slot die according to Example 1.

The tube produced according to Example 6 contains a water proportion of 10 percent by weight as well as 22 percent by weight of glycerin, both figures based on the total weight of the tube.

The table below gives the characteristic data of a tube produced according to Example 6. For reasons of comparison the characteristic data of another tube are given which has been produced under the conditions given in Example 6, with the exception however, that no stearyl trimethylol urea dispersion was added to the viscose solution. The second tube thus corresponds to a plasticized tube on the basis of cellulose hydrate which was produced in known manner.

| Properties | | tube produced according to Example 6 | comparison tube |
| --- | --- | --- | --- |
| Wall thickness | μ | ~ 90 | ~ 90 |
| rupture length, longitudinal | m | 3300 | 3100 |
| rupture length, transverse | m | 2900 | 2700 |
| elongation at rupture, longitudinal | % | 29 | 27 |
| elongation at rupture, transverse | % | 46 | 36 |
| bursting pressure, | | | |

| Properties | | tube produced according to Example 6 | comparison tube |
| --- | --- | --- | --- |
| m of water column | | 9.0 | 8.8 |
| elongation at break | % | 9.4 | 4.3 |
| swelling value, immediate | % | 130 | 146.3 |
| swelling value, after 7 months | % | 125 | 137 |

EXAMPLE 7

14.6 g (5 percent, based on the cellulose proportion) of a 24 percent by weight aqueous emulsion of stearylamide bis-dimethylene triazinone tetramethylol are added to 1 kg of viscose having a cellulose content of 7.1 percent by weight, based on the total weight of the solution, an alkali content of 5.78, a γ-value of 32.8, a sodium chloride ripeness of 3.25 and a viscosity of 123 falling-ball seconds at 25° C. The percentage by weight is based on the proportion of dispersed substance of the dispersion.

The liquid mixture is then pressed through an annular slot die having an external diameter of 18 mm, a process during which it forms a tubular body, into a precipitating liquid which is composed of an aqueous solution containing 10 percent by weight of sulfuric acid and 14 percent by weight of sodium sulfate, both figures being based on the total weight of the solution.

The tube is then passed through several regenerating baths in succession, the composition of which is known and explained in the description above, and through a washing liquid, such as water.

Then, the tube is passed through a trough containing an aqueous 11 percent by weight glycerin solution which has been adjusted to a pH-value of 2.5 by adding a suitable quantity of sulfuric acid.

The duration of action of the aqueous solution containing a secondary plasticizer on the tube is calculated in such a manner that the final product contains a glycerin proportion of about 19 percent by weight, based on the total weight of the tube.

After being treated with a plasticizer solution the tube is dried. For this purpose it is passed, in its inflated state and at a speed of about 20 m per minute, through a drier having a length of 50 m, a process during which the temperature in the entrance of the drier is about 90° C and at the end of it 120° C.

After leaving the drier the tube is sprayed with water. The duration of spraying and its intensity are calculated in such a manner that the tube has, after the treatment, a water content of about 16 percent, based on the total weight of the tube.

The tube produced according to the invention is very flexible and has a water-repellent surface (wetting angle 90°).

The tube is particularly suitable for use as an artificial sausage casing. If used for this purpose it can be easily shirred to form a stick which is then filled with sausage meat to make sausages. As an artificial sausage casing the tube produced according to the invention has the advantage that it can be easily removed from the sausage meat.

The table below gives the data for the tube produced according to Example 7, compared with another one for the production of which a conventional viscose solution was used (Example 7, but without adding stearylamide bis-dimethylene triazinone tetramethylol emulsion to the viscose solution).

centage by weight is based on the proportion of dispersed substance of the total weight of the aqueous emulsion.

The liquid mixture is then further treated as described in Example 1.

The tube produced according to the Example thus contains, because of the effect of the solution containing a secondary plasticizer on the tube and on the water treatment, a water proportion of about 16 percent by weight and a glycerin proportion of about 19 percent by weight, both figures being based on the total weight of the finished tube.

The table below gives the characteristic data of a tube produced according to Example 8. For reasons of comparison the characteristic data of another tube are given which was produced under the conditions given in Example 8, with the exception, however, that no stearylamide bis-dimethylene triazinone tetramethylol

| Properties | | tube produced according to Example 7 | | comparison tube | |
|---|---|---|---|---|---|
| | | figures immediately after production | figures after 8 months | figures immediately after production | figures after 8 months |
| Wall thickness | μ | 30 | 30 | 30 | 30 |
| bursting pressure, m of water column | | 6.8 | 7.0 | 5.0 | 5.7 |
| elongation at break | % | 33.8 | 30.4 | 36.2 | 36.7 |
| elongation at rupture, longitudinal | % | 38 | 34 | 45 | 38 |
| elongation at rupture, transverse | % | 100 | 92 | 104 | 80 |
| alternating bending figure | | 7217 | 7200 | 5622 | 6535 |

EXAMPLE 8

7.3 g (2.5%, based on the cellulose proportion of the viscose) of a 24 percent by weight aqueous stearylamide bis-dimethylene triazinone tetramethylol emulsion are mixed with 1 kg of viscose (having the same characteristic data as given in Example 1). The per- dispersion was added to the viscose solution. The second tube thus corresponds to a plasticized tube on the basis of cellulose hydrate which was produced in the known manner.

| Properties | | Tube produced according to Example 8 | | comparison tube | |
|---|---|---|---|---|---|
| | | Figures immediately after production | Figures after 8 months | Figures immediately after production | Figures after 8 months |
| Wall thickness | μ | 30 | 30 | 30 | 30 |
| bursting pressure | m of water column | 4.2 | 4.6 | 4.6 | 4.8 |
| expansion at break | % | 42.9 | 32.9 | 31.0 | 25.0 |
| rupture length, longitudinal | m | 4600 | 4450 | 4250 | 3850 |
| rupture length, transverse | m | 3150 | 3250 | 3650 | 2775 |
| elongation at rupture, longitudinal | % | 42 | 42 | 44 | 36 |
| elongation at rupture, transverse | % | 70 | 68 | 72 | 50 |
| alternating bending figure | | 5341 | 6960 | 5381 | 6221 |
| swelling value | % | 118 | | 126 | |

EXAMPLE 9

14.6 g (5 percent by weight, based on the cellulose proportion of the viscose) of an aqueous 24 percent by weight stearylamide bis-dimethylene triazinone tetramethylol dispersion, containing dyestuff, are, during stirring, added to 1 kg of viscose having the characteristic data given in Example 1. The dyed liquid mixture is then used for the impregnating and coating of a tube composed of paper fibers. For this purpose a known coating die having an annular slot is used through which the paper fiber tube is continuously passed, while at the same time the liquid mixture is caused to act upon its outer and/or inner surface. Due to this step a paper fiber tube is produced which is impregnated with the liquid mixture and which has on its surface a layer of this liquid mixture.

This tube is then further treated in the same manner as the liquid mixture leaving the annular slot die according to Example 7.

The tube produced according to Example 9 contains a water proportion of 10 percent by weight as well as 22 percent by weight of glycerin, both figures being based on the total weight of the tube.

The table below gives the characteristic data of a tube produced according to Example 9. For reasons of comparison the characteristic data of another tube are given which was produced under the conditions given in Example 9, with the exception, however, that no stearylamide bis-dimethylene triazinone tetramethylol dispersion was added to the viscose solution. The second tube thus corresponds to a plasticized tube on the basis of cellulose hydrate which was produced in the known manner.

| Properties | | tube produced according to Example 9 | comparison tube |
|---|---|---|---|
| Wall thickness | μ | 100 | 100 |
| rupture length, longitudinal | m | 3400 | 3025 |
| rupture length, transverse | m | 3100 | 2875 |
| elongation at rupture, longitudinal | % | 29 | 28 |
| elongation at rupture, transverse | % | 32 | 31 |
| bursting pressure | m of water column | 10.8 | 10.8 |
| swelling value, immediate | % | 132.5 | 119.3 |
| swelling value, after 7 months | % | 124.6 | 118.9 |

EXAMPLE 10

The process is carried out as in Example 9, with the exception, however, that 29.2 g (10 percent by weight, based on the cellulose proportion of the viscose) of a 24 percent by weight aqueous stearylamide bis-dimethylene triazinone tetramethylol dispersion are added to the viscose.

The other conditions are the same as those given in Example 9. By means of a shirring apparatus the tube produced is shirred in known manner to form a stick.

The table below gives the characteristic data of a tube produced according to Example 10. For reasons of comparison the characteristic data of a tube are given which was produced under the conditions given in Example 10, with the exception, however, that no stearylamide bis-dimethylene triazinone tetramethylol dispersion was added to the viscose solution. The second tube thus corresponds to a plasticized tube on the basis of cellulose hydrate which was produced in the known manner.

| Properties | | tube produced according to Example 10 | | comparison tube |
|---|---|---|---|---|
| | | 5% | 10% | |
| Wall thickness | μ | 100 | 100 | 100 |
| rupture length, longitudinal | m | 3400 | 3250 | 3200 |
| rupture length, transverse | m | 3000 | 2850 | 2925 |
| elongation at rupture, longitudinal | % | 27 | 29 | 30 |
| elongation at rupture, transverse | % | 36 | 46 | 38 |
| bursting pressure | m of water column | 7.8 | 8.0 | 7.9 |
| swelling value | % | 116 | 108 | 132 |
| expansion at break | % | 4.35 | 9.40 | 3.19 |

The effect of the different quantities of cross-linking agent in Examples 9 and 10 can distinctly be recognized from the increase in expansion at break.

For a definition of the γ-value mentioned in the description and in the examples which is, among other things, characteristic of a viscose solution, see "Kunststoffhandbuch", Volume 3, 1965, page 87 (Hanser-Verlag, Munchen).

EXAMPLE 11

29.2 g (10 percent by weight, based on the cellulose proportion) of a 24 percent by weight aqueous stearylamine bis-dimethylene triazinone tetramethylol dispersion are mixed with 1 kg of viscose having a cellulose content of 7.0 percent by weight, based on the total weight of the solution, an alkali content of 5.78, a $\gamma$-value of 31.7, a sodium chloride ripeness of 2.0 and a viscosity of 135 falling-ball seconds at 25° C. The percentage by weight is based on the proportion of dispersed substance in the total weight of the dispersion.

The liquid mixture is then pressed through an annular slot die having an external diameter of 80 mm, a process during which it forms a tubular body, into a precipitating liquid which is composed of an aqueous solution containing 10 percent by weight of sulfuric acid and 14 percent by weight of sodium sulfate, both figures being based on the total weight of the solution.

Then, the tube is passed through several regenerating baths in succession, the composition of which is known and explained in the description above, and through a washing liquid, i.e. through water. After being treated in this manner the tube is dried. For this purpose it is passed, in its inflated state and at a speed of about 20 m per minute through a drier having a length of 50 m, a process during which the temperature in the entrance of the drier is about 90° C and at the end of it 120° C.

After leaving the drier the tube is sprayed with water. The duration of spraying and its intensity are calculated in such a manner that the tube has, after this treatment, a water content of about 16 percent by weight, based on the total weight of the tube. The tube produced according to the process is very flexible and has a water-repellent surface (wetting angle 90° C).

The tube is particularly suitable for use as an artificial sausage casing. If used for this purpose it can be easily shirred to form a stick which is then filled with sausage meat to make sausages. As an artificial sausage casing the tube produced according to the invention has the advantage that it can be easily removed from the sausage meat.

The table below gives the characteristic data of the tube produced according to Example 11, compared with a tube that also contains 10 per cent by weight, based on cellulose, of stearylamine bis-dimethylene triazinone tetramethylol, chemically linked with cellulose, but which contains in addition, 23.5 per cent by weight of glycerin, based on the total weight of the tube, as a secondary plasticizer.

It is not possible to compare the tube produced according to Example 11 with a tube having a small quantity of secondary plasticizer which would correspond to the quantity of primary plasticizer without being internally plasticized, because it is not possible to produce a tube on the basis of cellulose hydrate with such a small quantity of secondary plasticizer.

| Properties | | tube produced according to Example 11 | | comparison tube | |
|---|---|---|---|---|---|
| | | immediate | after 6 months | immediate | after 6 months |
| Wall thickness | $\mu$ | 30 | 30 | 30 | 30 |
| expansion at break | % | 93 | 76.5 | 81.9 | 74.3 |
| bursting pressure | m of water column | 3.2 | 3.4 | 2.9 | 3.1 |
| rupture length, longitudinal | m | 5450 | 5500 | 4450 | 4450 |
| rupture length, transverse | m | 2525 | 2300 | 2600 | 2650 |
| elongation at rupture, longitudinal | % | 44 | 40 | 40 | 46 |
| elongation at rupture, transverse | % | 140 | 130 | 125 | 120 |
| swelling value | % | 94.6 | 87.9 | 125 | 119 |
| weight per m² | % | 105 | | 100 | |

The comparison tube is produced as described in Example 11, with the exception, however, that, before being dried by heating, the tube is contacted with a glycerin solution, until it has accepted the quantity of plasticizer mentioned above.

EXAMPLE 12

11.7 (4 per cent by weight, based on the cellulose proportion) of an aqueous 24 per cent by weight stearylamine bis-dimethylene triazinone tetramethylol dispersion are, during stirring, added to 1 kg of viscose having a cellulose content of 7.1 per cent by weight, based on the total weight of the solution, an alkali content of 5.84, a $\gamma$-value of 30.2, a sodium chloride ripeness of 2.0 and a viscosity of 161 falling-ball seconds at 25° C.

The liquid mixture thus produced is then passed in the form of a tubular body, through an annular slot die having a diameter of 120 mm into a precipitating liquid which is composed of an aqueous solution containing 10 per cent by weight of sulfuric acid and 14 per cent by weight of sodium sulfate. The percentages by weight are based on the total weight of the liquids. The precipitating liquid mentioned in Example 11 has the same composition as the one mentioned above.

The tube is then, as described in Example 11, passed through several known regenerating and washing baths and is then, in its inflated state and at a speed of 11 m per minute, passed through a drier having a length of 50 m and a temperature of approximately 90° C and 120° C at its entrance and its end, respectively.

After leaving the drier, the tube is sprayed with water until it has a water content of about 10 per cent by weight, based on the total weight of the tube.

The table below gives the characteristic data of a tube produced according to Example 12, compared with another one also containing 4 per cent by weight of sterylamine bis-dimethylene triazinone tetramethylol, chemically linked with cellulose, but in addition having 25 per cent by weight of glycerin as an incorporated secondary plasticizer.

| Properties | | tube produced according to Example 12 | | comparison tube | |
|---|---|---|---|---|---|
| | | immediately | after 6 months | immediately | after 6 months |
| Wall thickness | μ | 30 | 30 | 30 | 30 |
| bursting pressure | m of water column | 3.1 | 3.2 | 2.7 | 2.8 |
| expansion at break | % | 82.4 | 75.4 | 75.6 | 78.2 |
| rupture length, longitudinal | m | 4950 | 5250 | 3800 | 3425 |
| rupture length, transverse | m | 2500 | 2750 | 2050 | 1900 |
| elongation at rupture, longitudinal | % | 50 | 42 | 48 | 48 |
| elongation at rupture, transverse | % | 140 | 130 | 130 | 130 |
| swelling value | % | 85 | 83 | 138 | 134 |

The comparison tube is produced under the conditions given in Example 12, with the exception, however, that before being dried by heating, the tube is contacted with an 11 per cent by weight aqueous glycerin solution until it contains about 25 percent by weight of glycerin. (The aqueous glycerin solution used in Example 11 for the adjustment of the glycerin content of the tube contains the same percentage of glycerin, i.e. 11 per cent by weight, as the solution used in Example 12.)

EXAMPLE 13

35 g (10 per cent by weight, based on cellulose) of a 20 per cent by weight aqueous stearyl trimethylol urea dispersion are, during stirring, added to 1 kg of viscose having a cellulose content of 7 per cent by weight, an alkali content of 5.8, a γ-value of 29.4 a sodium chloride ripeness of 2.5 and a viscosity of 140 falling-ball seconds at 25° C. The percentage of the dispersion is based on the total weight of the liquid. The liquid mixture is then pressed through an annular slot die having a diameter of 60 mm, a process during which it forms a tubular body, into a precipitating liquid having the composition given in Example 12. The tube is then further treated as described in Example 11.

In the table the tube produced according to Example 13 is compared with a tube produced under the conditions described in Example 13 also, with the exception, however, that before being dried by heating, the tube is contacted with an aqueous 11 per cent by weight glycerin solution until it has a glycerin proportion of about 25 per cent by weight.

| Properties | | tube produced according to Example 13 | comparison tube |
|---|---|---|---|
| Wall thickness | μ | 100 | 100 |
| rupture length, longitudinal | m | 4950 | 4150 |
| rupture length, transverse | m | 2500 | 2500 |
| elongation at rupture, longitudinal | % | 50 | 55 |
| elongation at rupture, transverse | % | 140 | 140 |
| bursting pressure | m of water column | 3.1 | 2.7 |
| expansion at break | % | 82.4 | 87.4 |

-continued

| Properties | | tube produced according to Example 13 | comparison tube |
|---|---|---|---|
| swelling value | % | 85 | 139 |

EXAMPLE 14

35 g (10 per cent by weight, based on cellulose) of a 20 per cent by weight aqueous stearyl trimethylol urea dispersion are, during stirring, mixed with 1 kg of viscose having a cellulose content of 7 percent by weight, an alkali content of 5.8, a γ-value of 29.4, a sodium chloride ripeness of 2.5 and a viscosity of 140 falling-ball seconds at 25° C. The percentage of dispersion is based on the total weight of the dispersion.

The liquid mixture is then used for impregnating and coating a fiber tube. For this purpose it is passed through the annular slot of a die. The liquid mixture described above is continuously passed through annular exits in the annular slot and caused to act upon the fiber tube which is thus impregnated and coated with the liquid mixture. The impregnated and coated fiber tube leaving the annular slot is then further treated as the tubular body composed of liquid mixture which leaves the annular slot die in Example 11.

The table below gives the characteristic data of a tube produced according to Example 14 and of a comparison tube.

The comparison tube is produced under the same conditions as those given in Example 14, with the exception, however, that, before being dried by heating, the tube is contacted with an 11 per cent aqueous glycerin solution until it has accepted about 22 per cent by weight of glycerin.

| Properties | | tube produced according to Example 14 | comparison tube |
|---|---|---|---|
| Wall thickness | μ | 90 | 90 |
| rupture length, longitudinal | m | 4450 | 3100 |
| rupture length, transverse | m | 3975 | 2700 |
| elongation at rupture, longitudinal | % | 30 | 27 |
| elongation at rupture, transverse | % | 40 | 36 |
| bursting pressure | m of water column | 11.4 | 8.8 |

-continued

| Properties | | tube produced according to Example 14 | comparison tube |
|---|---|---|---|
| expansion at break | % | 6.6 | 4.3 |
| swelling value | % | 105 | 146.3 |

EXAMPLE 15

29.2 g (10 per cent by weight, based on cellulose) of a 24 per cent by weight aqueous stearylamine bis-dimethylene triazinone tetramethylol dispersion are, while being stirred, mixed with 1 kg of viscose having the characteristic data given in Example 14.

The table gives the characteristic data of a tube produced according to Example 15.

The comparison tube is produced under the same conditions as those given in Example 15, with the exception, however, that, after being dried by heating, the tube is contacted with an 11 per cent aqueous glycerin solution until it has a glycerin content of 25 per cent by weight.

| Properties | | tube produced according to Example 15 | comparison tube |
|---|---|---|---|
| Wall thickness | μ | 85 | 85 |
| rupture length, longitudinal | m | 4850 | 3700 |
| rupture length, transverse | m | 3550 | 3100 |
| elongation at rupture, longitudinal | % | 34 | 34 |
| elongation at rupture, transverse | % | 42 | 44 |
| bursting pressure | m of water column | 10.0 | 9.5 |
| expansion at break | % | 8.5 | 8.7 |
| swelling value | % | 77.4 | 110 |

EXAMPLE 16

29.2 g (10 per cent by weight, based on the cellulose proportion) of a 24 per cent by weight aqueous stearylamide bis-dimethylene triazinone tetramethylol dispersion are mixed with 1 kg of viscose having a cellulose content of 7.0 per cent by weight, based on the total weight of the solution, an alkali content of 5.78, a γ-value of 31.7, a sodium chloride ripeness of 2.0 and a viscosity of 135 falling-ball seconds at 25° C. The percentage by weight is based on the proportion of dispersed substance in the total weight of the dispersion.

The liquid mixture is then pressed through an annular slot die having an external diameter of 80 mm, a process during which it forms a tubular body, into a precipitating liquid which is composed of an aqueous solution containing 10 per cent by weight of sulfuric acid and 14 per cent by weight of sodium sulfate, both figures being based on the total weight of the solution.

The tube is then passed through several regenerating baths in succession, the composition of which is known and explained in the description above, and through a washing liquid, i.e. through water. Then the tube is dried. For this purpose it is, in its inflated state and at a speed of about 20 m per minute, passed through a drier having a length of 50 m, the temperature at the entrance of the drier being about 90° C and at the end of it 120° C.

After leaving the drier the tube is sprayed with water. The duration of spraying and its intensity are calculated in such a manner that the tube has, after this treatment, a water content of about 16 per cent by weight, based on the total weight of the tube. The tube produced according to the process is very flexible and has a water-repellent surface (wetting angle 90° C).

The tube is particularly suitable for use as an artificial sausage casing. If used for this purpose it can be easily shirred to form a stick which is then filled with sausage meat to make sausages. As an artifical sausage casing the tube produced according to the invention has the advantage that it can be easily removed from the sausage meat.

The table below gives the characteristic data of the tube produced according to Example 16, compared with a tube which also contains 10 per cent by weight based on cellulose, of stearylaminde bis-dimethylene triazinone tetramethylol chemically linked with cellulose, but, in addition contains 23.5 per cent by weight of glycerin as secondary plasticizer, based on the total weight of the tube.

It is not possible to compare a tube produced according to Example 16 with a tube having a small quantity of secondary plasticizer which would correspond to the quantity of primary plasticizer, but without being internally plasticized, because it is not possible to produce a tube on the basis of cellulose hydrate which has such a small quantity of secondary plasticizer.

| Properties | | tube produced according to Example 16 | | comparison tube | |
|---|---|---|---|---|---|
| | | immediately | after 6 months | immediately | after 6 months |
| Wall thickness | μ | 30 | 30 | 30 | 30 |
| expansion at break | % | 93 | 76.5 | 81.9 | 74.3 |
| bursting pressure | m of water column | 3.4 | 3.6 | 2.9 | 3.1 |
| rupture length, longitudinal | m | 5600 | 5650 | 4450 | 4450 |
| rupture length, transverse | m | 2600 | 2400 | 2600 | 2650 |
| elongation at rupture, longitudinal | % | 44 | 40 | 40 | 46 |
| elongation at rupture, transverse | % | 140 | 130 | 125 | 120 |
| swelling | | | | | |

| Properties | | tube produced according to Example 16 | | comparison tube | |
|---|---|---|---|---|---|
| | | immediately | after 6 months | immediately | after 6 months |
| value | % | 94.6 | 87.9 | 125 | 119 |
| weight per m² | % | 105 | | 100 | |

The comparison tube is produced as described in Example 16, with the exception, however, that, before being dried by heating, the tube is contacted with a cally linked with cellulose, but furthermore containing 25 per cent by weight of glycerin as incorporated secondary plasticizer.

| Properties | | tube produced according to Example 17 | | comparison tube | |
|---|---|---|---|---|---|
| | | immediately | after 6 months | immediately | after 6 months |
| Wall thickness | μ | 30 | 30 | 30 | 30 |
| bursting pressure | m of wat. column | 3.3 | 3.4 | 2.7 | 2.8 |
| expansion at break | % | 82.4 | 75.4 | 75.6 | 78.2 |
| rupture length, longitudinal | m | 5300 | 5450 | 3800 | 3425 |
| rupture length, transverse | m | 2600 | 2850 | 2050 | 1900 |
| elongation at rupture, longitudinal | % | 50 | 42 | 48 | 48 |
| elongation at rupture, transverse | % | 140 | 130 | 130 | 130 |
| swelling value | % | 85 | 83 | 138 | 134 | glycerin solution until it has accepted the quantity of plasticizer mentioned above.

EXAMPLE 17

11.7 g (4 per cent by weight, based on the cellulose proportion) of an aqueous 24 per cent by weight stearylamide bis-dimethylene triazinone tetramethylol dispersion are, while being stirred, mixed with 1 kg of viscose having a cellulose content of 7.1 per cent by weight based on the total weight of the solution, an alkali content of 5.84, a γ-value of 30.2, a sodium chloride ripeness of 2.0 and a viscosity of 161 falling-ball seconds at 25° C.

The liquid mixture thus produced is then passed, in the form of a tubular body, through an annular slot die having a diameter of 120 mm into a precipitating liquid composed of an aqueous solution which contains 10 per cent by weight of sulfuric acid and 14 per cent by weight of sodium sulfate. The percentages by weight are based on the total weight of the liquids.

As described in Example 16, the tube is then passed through several regenerating and washing baths and, in its inflated state and at a speed of 11 m per minute, through a drier having a length of 50 m and a temperature of about 90° C and 120° C at its entrance and end, respectively.

After leaving the drier the tube is sprayed with water until it has a water content of about 10 per cent by weight, based on the total weight of the tube.

The table below gives the characteristic data of the tube produced according to Example 17 compared with a tube also having 4 per cent by weight of stearylamide bis-dimethylene triazinone tetramethylol, chemi- The comparison tube is produced under the conditions given in Example 17, with the exception, however, that, before being dried by heating, the tube is contacted with an 11 per cent by weight aqueous glycerin solution until it contains about 25 per cent by weight of glycering. (The aqueous glycerin solution used in Example 16 for adjusting the glycerin content of the tube has the same percentage of glycerin content as the solution used in Example 17, i.e. 11 per cent by weight.)

EXAMPLE 18

1 kg of viscose having the same characteristic data as given in Example 17 is mixed, during stirring, with 29.2 g (10 per cent by weight, based on cellulose) of a 24 per cent by weight aqueous stearylamide bis-dimethylene triazinone tetramethylol dispersion. This liquid mixture is used as described in Example 17.

The table gives the characteristic data of a tube produced according to Example 18.

The comparison tube is produced under the same conditions as given in Example 18, with the exception, however, that after being dried by heating the tube is contacted with an 11 per cent aqueous glycerin solution until it has a glycerin content of 25 per cent by weight.

| Properties | | tube produced according to Example 18 | comparison tube |
|---|---|---|---|
| Wall thickness | μ | 85 | 85 |
| rupture length, longitudinal | m | 5200 | 3700 |
| rupture length, transverse | m | 3700 | 3100 |

| Properties | | tube produced according to Example 18 | comparison tube |
|---|---|---|---|
| elongation at rupture longitudinal | % | 34 | 34 |
| elongation at rupture transverse | % | 42 | 44 |
| bursting pressure | m of water column | 10.8 | 9.5 |
| expansion at break | % | 8.5 | 8.7 |
| swelling value | % | 77.4 | 110 |

EXAMPLE 19

1 kg of viscose having a cellulose content of 7.1 per cent by weight, based on the total weight of the solution, an alkali content of 5.78, a γ-value of 29.4, a sodium chloride ripeness of 2.5 and a viscosity of 137 falling-ball seconds at 25° C, is mixed, during stirring, with 18.0 g (6 per cent, based on the cellulose proportion) of 23 per cent by weight aqueous emulsion of stearyl ethylene urea. The percentage by weight is based on the proportion of dispersed substance in the total weight of the dispersion.

The liquid mixture is then pressed through an annular slot die having an external diameter of 18 mm, a process during which it forms a tubular body, into a precipitating liquid which is composed of an aqueous solution containing 10 per cent by weight of sulfuric acid and 14 per cent by weight of sodium sulfate, both figures being based on the total weight of the solution.

The tube is then passed through several regenerating baths in succession, the composition of which is known and explained in the description above and through a washing liquid, for example water. Then the tube is passed through a trough containing an 11 per cent by weight glycerin solution which is adjusted to a pH-value of 2.5 by adding a suitable quantity of sulfuric acid.

The duration of action of the aqueous containing the secondary plasticizer on the tube is calculated in such a manner that the final product has a glycerin proportion of about 22 per cent by weight, based on the total weight of the tube.

After being treated with a plasticizer solution the tube is dried. For this purpose the tube is passed, in its inflated state and at a speed of about 20 m per minute, through a drier having a length of 50 m and a temperature of about 90° C and 120° C at its entrance and exit, respectively.

After leaving the drier the tube is sprayed with water. The duration and intensity of spraying are calculated in such a manner that the tube has, after the treatment, a water content of about 16 per cent, based on the total weight of the tube.

The tube produced according to the process is very flexible and has a water-repellent surface (wetting angle 90° C). It is particularly suitable for use as an artificial sausage casing. If used for this purpose the tube can be easily shirred to form a stick which is then filled with sausage meat to make sausages. As an artificial sausage casing the tube according to the invention has the advantage that it can be easily removed from the sausage meat.

The tube contains as an internal plasticizer about 3.6 per cent by weight (based on the total weight of the tube) of stearyl ethylene urea chemically incorporated in the tube as well as 22 per cent by weight of glycerin as a secondary plasticizer.

EXAMPLE 20

The procedure is as described in Example 19, with the exception, however, that 1 kg of viscose having the characteristic data given in Example 19 are mixed with 18.0 g (6 per cent by weight, based on cellulose) of a 23 per cent by weight aqueous emulsion of stearyl ethylene urea and 29.2 g (10 per cent by weight, based on cellulose) of a 24 per cent by weight aqueous stearylamine bis-dimethylene triazinone tetramethylol dispersion and that the liquid mixture or the tube produced is further used or treated as described in Example 1.

EXAMPLE 21

A liquid mixture produced according to Example 19 is used for impregnating and coating a tube composed of paper fibers. For this purpose the liquid mixture is caused, by means of a known coating die having an annular slot (internal diameter of the die is 60 mm) through which the paper fiber tube is continuously passed, to act simultaneously upon its external and/or internal surface. Due to this step a paper fiber tube is produced which is impregnated with the liquid mixture and which has on its surface a layer of this liquid mixture.

This tube is then further treated in the same manner as the liquid mixture leaving the annular slot die according to Example 19.

The tube produced according to Example 19 has a water proportion of 16 per cent by weight as well as 22 per cent by weight of glycerin, both figures being based on the total weight of the tube, and contains 5.6 per cent by weight of stearylamine bis-dimethylene triazinone tetramethylol as an internal plasticizer.

The tabe below gives the characteristic data of a tube produced according to Example 21, compared with a tube produced according to a known process, i.e. according to this Example 21, but with the exception that nothing but a viscose solution leaves the annular slot die and is passed into the precipitating liquid.

| Properties | | comparison tube | tube produced according to Example 21 |
|---|---|---|---|
| bursting pressure | m of water column | 5.3 | 7.5 |
| expansion at break | % | 39.5 | 60 |
| rupture length, longitudinal | m | 4075 | 5300 |
| rupture length, transverse | m | 3100 | 3500 |
| elongation at rupture, longitudinal elongation | % | 55 | 62 |

-continued

| Properties | | comparison tube | tube produced according to Example 21 |
|---|---|---|---|
| at rupture, transverse | % | 100 | 115 |
| alternating bending figure | | 5800 | 11,000 |
| weight per m² | g | 43.5 | 43.5 |
| swelling value immediate | % | 157 | 132 |
| swelling value, after 3 weeks | % | 149 | 128 |

EXAMPLE 22

A liquid mixture produced according to Example 20 is used for impregnating and coating a tube composed of paper fibers. For this purpose the liquid mixture is caused, by means of a known coating die having an annular slot (internal diameter of the die is 60 mm) through which the paper fiber tube is continuously passed, to act simultaneously on its external and/or internal surface. Due to this step a paper fiber tube is produced which is impregnated with the liquid mixture and which has on its surface a layer of this liquid mixture.

This tube is then further treated in the same manner as the liquid mixture leaving the annular slot die according to Example 19.

EXAMPLE 23

The procedure is as described in Example 19, with the exception, however, that 1 kg of viscose having the characteristic data given in Example 19 are mixed with 18.0 g (6 per cent by weight, based on cellulose) of a 23 per cent by weight aqueous emulsion of stearyl ethylene urea and 29.2 g (10 per cent by weight, based on cellulose) of a 24 per cent by weight aqueous stearyl trimethylol urea dispersion and that the liquid mixture or the tube produced is further used or treated as described in Example 19.

EXAMPLE 24

A liquid mixture produced according to Example 23 is used for impregnating and coating a tube composed of paper fibers. For this purpose the liquid mixture is caused, by means of a known coating die having an annular slot (internal diameter of the die is 60 mm) through which the paper fiber tube is continuously passed, to act simultaneously upon its internal and/or external surface. Due to this step a paper fiber tube is produced which is impregnated with the liquid mixture and which has on its surface a layer of the liquid mixture.

This tube is then further treated in the same manner as the liquid mixture leaving the annular slot die according to Example 19.

The tubes produced according to the Examples are suitable for use as artificial sausage casings.

The shaped bodies according to the invention have, compared with those produced according to known processes and containing incorporated secondary plasticizers in the range from 18 to 25 per cent by weight, the advantage that the strength of the products according to the invention is greater, their swelling values are lower and their elasticity is basically the same as that of the known material. These properties of the shaped bodies according to the invention do not change, even after a longer storage.

The drawing shows the cross-section of a tube composed of cellulose hydrate and compounds which are produced if cellulose derivatives having reactive OH groups are caused to react chemically with stearylamide bis-dimethylene triazinone tetramethylol. The tube also contains a secondary chemical plasticizer as well as a fiber matrix.

In the drawing 1 designates the tube, 2 the fiber reinforcement and 3 the material forming the tube.

It will be obvious to those skilled in the art that many modifications may be made within the scope of the present invention without departing from the spirit thereof, and the invention includes all such modifications.

What is claimed is:

1. A process for the production of a shaped body from a cellulose derivative which comprises extruding a viscose solution through a shaping die into a precipitation bath and passing the shaped body thus formed through regenerating and washing baths, then treating the body with an acid aqueous solution of a chemical plasticizer for regenerated cellulose, drying it by heating, and finally moistening it with water after drying, said viscose solution being mixed with a liquid containing alkyl-trimethylol-urea of the following general formula

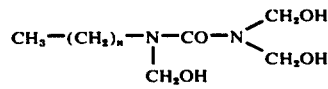

wherein n is a whole number between 9 and 24, preferably between 14 and 19, and especially the number 17, and/or with a liquid containing alkyl-ethylene-urea of the following general formula

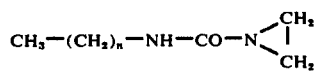

wherein n is a whole number between 11 and 19, preferably between 15 and 18, and especially the number 17, or with a liquid containing alkylamine-bis-dimethylene-triazinonetetramethylol of the following general formula

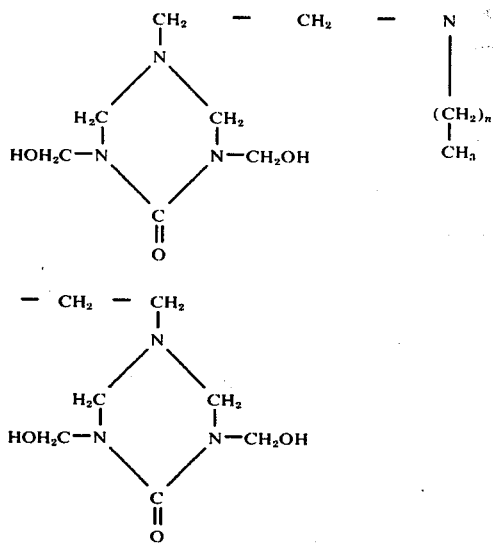

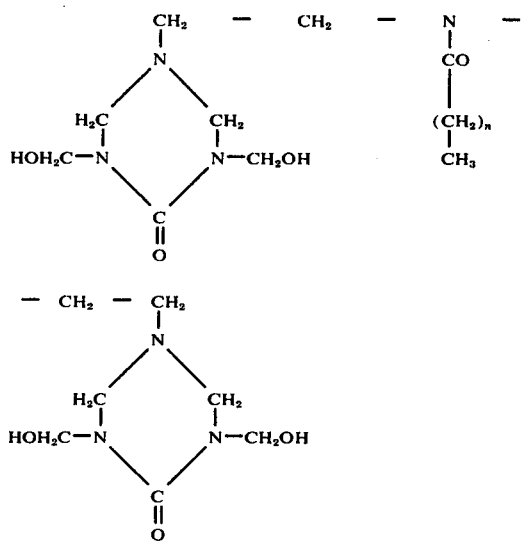

wherein n is a whole number between 9 and 24, preferably between 14 and 19, and especially the number 17.

2. A process according to claim 1 in which the viscose solution is mixed with an aqueous dispersion of alkyl-trimethylol-urea of the following general formula

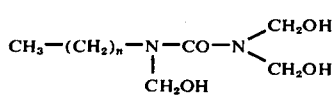

wherein n is a whole number between 9 and 24, preferably between 14 and 19, and especially the number 17, and/or of alkyl-ethylene-urea of the following general formul

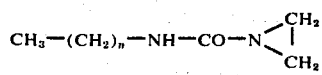

wherein n is a whole number between 11 and 19, preferably 15 and 18, and especially the number 17.

3. A process according to claim 2 in which the viscose solution is mixed with an aqueous dispersion which contains, as the dispersed component, alkyl-trimethylol-urea and/or alkyl-ethylene-urea of the general formula indicated in claim 2 in a proportion between 10 and 30 per cent by weight, based on the total weight of the aqueous dispersion.

4. A process according to claim 2 in which the viscose solution is mixed with an aqueous solution which contains, as the dispersed component, alkyl-trimethylol-urea and/or alkyl-ethylene-urea of the general formulae indicated in claim 2 in a proportion between 20 and 25 per cent by weight, based on the total weight of the aqueous dispersion.

5. A process according to claim 1 in which the viscose solution is mixed with an aqueous dispersion of stearyl-trimethylol-urea and/or of stearyl-ethylene-urea.

6. A process according to claim 1 in which the viscose solution is mixed with an aqueous dispersion of stearyl-trimethylol-urea and/or stearyl-ethylene-urea containing the dispersed component in a proportion between 10 and 30 per cent by weight, based on the total weight of the dispersion.

7. A process according to claim 6 in which the viscose solution is mixed with an aqueous dispersion of stearyl-trimethylol-urea and/or stearyl-ethylene-urea containing the dispersed component in a proportion between 20 and 25 per cent by weight, based on the total weight of the dispersion.

8. A process according to claim 1 in which the viscose solution is mixed with an aqueous dispersion of alkylamine-bis-dimethylene-triazinone-tetramethylol of the following general formula

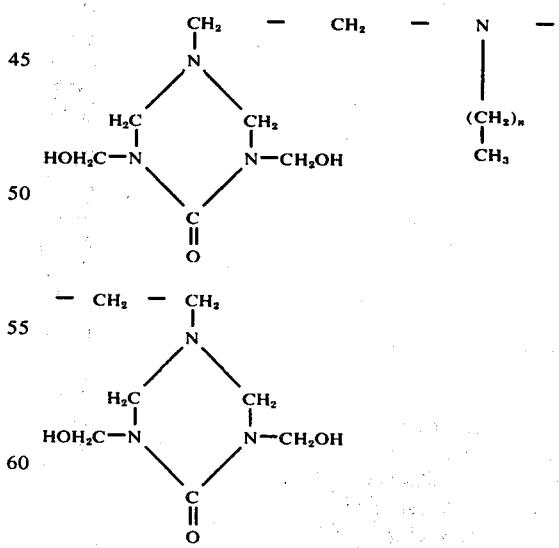

wherein n is a whole number between 9 and 24, preferably between 14 and 19, and especially the number 17, or of alkylamide-bis-dimethylene-triazinone-tetramethylol of the following general formula

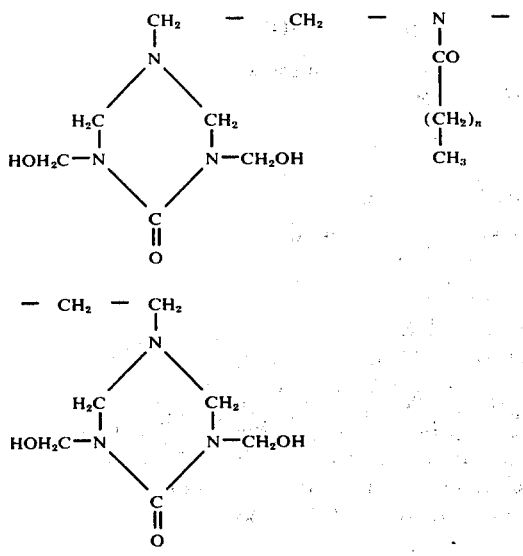

wherein n is a whole number between 9 and 24, preferably between 14 and 19, and especially the number 17.

9. A process according to claim 1 in which the viscose solution is mixed with an aqueous dispersion which contains, as the dispersed component, the compounds corresponding to the formulae in claim 8 in a proportion between 10 and 30 per cent by weight, based on the total weight of the aqueous dispersion.

10. A process according to claim 9 in which the viscose solution is mixed with an aqueous dispersion which contains, as the dispersed component, the compounds corresponding to the formulae indicated in claim 8 in a proportion between 20 and 25 per cent by weight, based on the total weight of the aqueous dispersion.

11. A process according to claim 1 in which the viscose solution is mixed with an aqueous dispersion of stearylamine-bis-dimethylene-triazinone-tetramethylol or stearylamide-bis-dimethylene-triazinone-tetramethylol which contains the dispersed component in a proportion between 10 and 30 per cent by weight, based on the total weight of the dispersion.

12. A process according to claim 11 in which the viscose solution is mixed with an aqueous dispersion of stearylamine-bis-dimethylene-triazinone-tetramethylol or stearylamide-bis-dimethylene-triazinone-tetramethylol which contains the dispersed component in a proportion between 20 and 25 per cent by weight, based on the total weight of the dispersion.

13. A process according to claim 1 in which the liquid mixture contains a proportion between 0.5 and 40 per cent by weight, based on the weight of the cellulose component, of alkyl-trimethylol-urea and/or alkyl-ethylene-urea corresponding to the general formulae indicated in claim 1.

14. A process according to claim 1 in which the liquid mixture contains a proportion between 1 and 15 per cent by weight, based on the weight of the cellulose component, of alkyl-trimethylol-urea and/or alkyl-ethylene-urea corresponding to the general formulae indicated in claim 1.

15. A process according to claim 1 in which the liquid mixture contains a proportion between 0.5 and 40 per cent by weight, based on the weight of the cellulose component, of stearyl-trimethylol-urea and/or stearyl-ethylene-urea.

16. A process according to claim 1 in which the liquid mixture contains a proportion between 1 and 15 per cent by weight, based on the weight of the cellulose component, of stearyl-trimethylol-urea and/or stearyl-ethylene-urea.

17. A process according to claim 1 in which the liquid mixture contains a proportion between 0.5 and 40 per cent by weight, based on the weight of the cellulose component, of alkylamine-bis-dimethylene-triazinone-tetramethylol or alkylamide-bis-dimethylene-triazinone-tetramethylol corresponding to the general formulae indicated in claim 1.

18. A process according to claim 17 in which the liquid mixture contains a proportion between 1 and 15 per cent by weight, based on the weight of the cellulose component, of alkylamine-bis-dimethylene-triazinone-tetramethylol or alkylamide-bis-dimethylene-triazinone-tetramethylol corresponding to the general formulae indicated in claim 1.

19. A process according to claim 17 in which the liquid mixture contains a proportion between 0.5 and 40 per cent by weight, based on the weight of the cellulose component, of stearylamine-bis-dimethylene-triazinone-tetramethylol or stearylamide-bis-dimethylene-triazinone-tetramethylol.

20. A process according to claim 18 in which the liquid mixture contains a proportion between 1 and 15 per cent by weight, based on the weight of the cellulose component, of stearylamine-bis-dimethylene-triazinone-tetramethylol or stearylamide-bis-dimethylene-triazinone-tetramethylol. triazinone-tetramethylol.

21. A process according to claim 1 in which the acid aqueous liquid containing the chemical plasticizer contains glycerol, glycol or polyglycol in a proportion between 18 and 25 per cent by weight, based on the total weight of the liquid.

22. A process according to claim 2 in which the viscose solution is mixed with a liquid containing alkyl-ethylene-urea of the following general formula

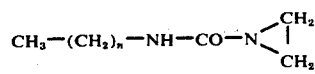

wherein n is a whole number between 11 and 19, preferably between 15 and 18, and especially the number 17, and alkyl-trimethylol-urea of the following general formula

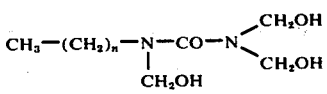

wherein n is a whole number between 9 and 24, preferably between 14 and 19, and especially the number 17.

23. A process according to claim 22 in which stearyl-ethylene-urea and/or stearyl-trimethylol-urea is used as the urea derivative.

24. A process for the production of a shaped body from a cellulose derivative which comprises extruding a viscose solution through a shaping die into a precipitation bath, passing the shaped body thus formed through regenerating and washing baths, then drying it by heating, and finally moistening it with water, said viscose solution being mixed with a liquid containing alkyl-trimethylol-urea of the following general formula

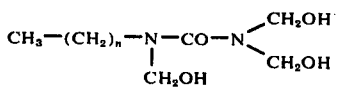

wherein $n$ is a whole number between 9 and 24, preferably between 14 and 19, and especially the number 17, and/or a liquid containing alkyl-ethylene-urea of the following general formula

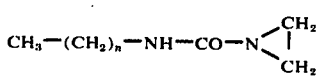

wherein $n$ is a whole number between 11 and 19, preferably between 15 and 18, and especially the number 17, or a liquid containing alkylamine-bis-dimethylene-triazinone-tetramethylol of the following general formula

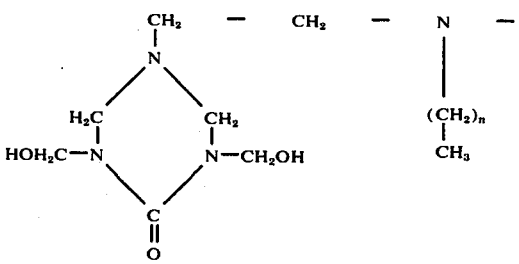

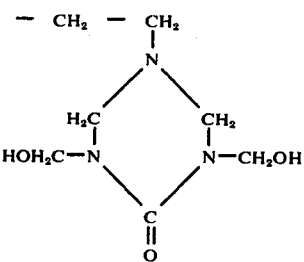

wherein $n$ is a whole number between 9 and 24, preferably between 14 and 19, and especially the number 17, or a liquid containing alkylamide-bis-dimethylene-triazinone-tetramethylol of the following general formula

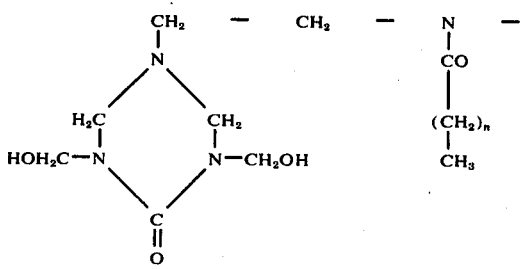

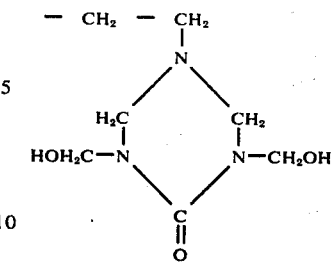

wherein $n$ is a whole number between 9 and 24, preferably between 14 and 19, and especially the number 17.

25. A process according to claim 24 in which the viscose solution is mixed with an aqueous dispersion of alkyl-trimethylol-urea of the following general formula

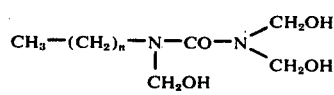

wherein $n$ is a whole number between 9 and 24, preferably between 14 and 19, and especially the number 17, and/or an aqueous dispersion of alkyl-ethylene-urea of the following general formula

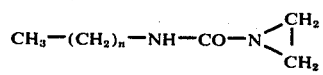

wherein $n$ is a whole number between 11 and 19, preferably between 15 and 18, and especially the number 17.

26. A process according to claim 25 in which the viscose solution is mixed with an aqueous dispersion containing, as the dispersed component, alkyl-trimethylol-urea and/or alkyl-ethylene-urea of the general formulae indicated in claim 2 in a proportion between 10 and 30 per cent by weight, based on the total weight of the aqueous dispersion.

27. A process according to claim 25 in which the viscose solution is mixed with an aqueous dispersion containing, as the dispersed component, alkyl-trimethylol-urea and/or alkyl-ethylene-urea of the general formulae indicated in claim 2 in a proportion between 20 and 25 per cent by weight, based on the total weight of the aqueous dispersion.

28. A process according to claim 24 in which the viscose is mixed with an aqueous dispersion of stearyl-trimethylol-urea and/or an aqueous dispersion of stearyl-ethylene-urea.

29. A process according to claim 28 in which the viscose is mixed with an aqueous dispersion of stearyl-trimethylol-urea and/or an aqueous dispersion of stearyl-ethylene-urea with a proportion of dispersed substance between 10 and 30 per cent by weight, based on the total weight of the dispersion.

30. A process according to claim 28 in which the viscose solution is mixed with an aqueous dispersion of stearyl-trimethylol-urea and/or an aqueous dispersion of stearyl-ethylene-urea with a proportion of dispersed substance between 20 and 25 per cent by weight, based on the total weight of the dispersion.

31. A process according to claim 24 in which the viscose solution is mixed with an aqueous dispersion of alkylamine-bis-dimethylene-triazinone-tetramethylol of the following general formula

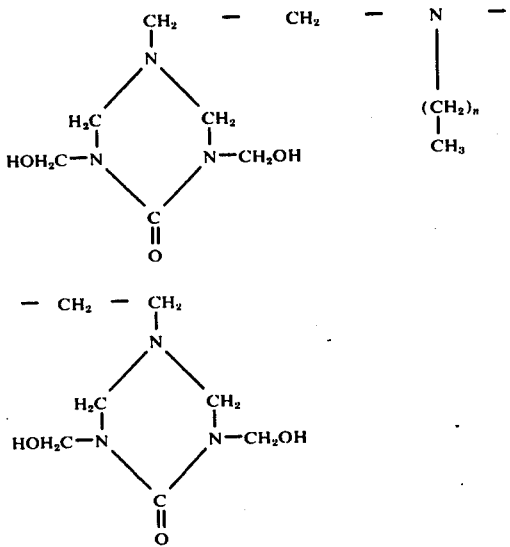

wherein *n* is a whole number between 9 and 24, preferably between 14 and 19, and especially the number 17, or of alkylamide-bis-dimethylene-triazinone-tetramethylol of the following general formula

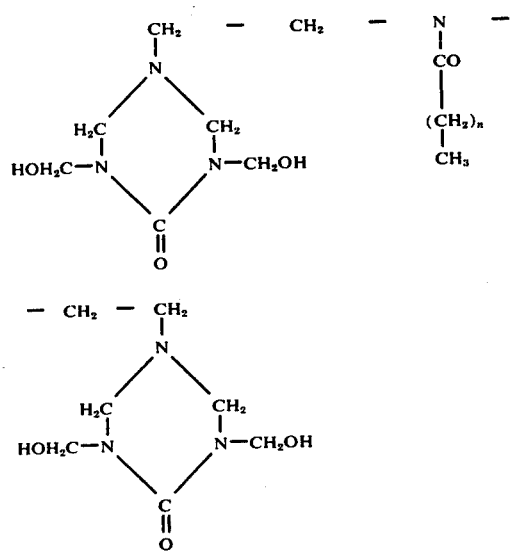

wherein *n* is a whole number between 9 and 24, preferably between 14 and 19, and especially the number 17.

32. A process according to claim 31 in which the viscose solution is mixed with an aqueous dispersion containing a proportion of dispersed substance between 10 and 30 per cent by weight, based on the total weight of the dispersion.

33. A process according to claim 32 in which the viscose solution is mixed with an aqueous dispersion containing a proportion of dispersed substance between 20 and 25 per cent by weight, based on the total weight of the dispersion.

34. A process according to claim 29 in which the viscose solution is mixed with an aqueous dispersion of stearylamine-bis-dimethylene-triazinone-tetramethylol or stearylamide-bis-dimethylene-triazinone-tetramethylol containing a proportion of dispersed substance between 10 and 30 per cent by weight, based on the total weight of the dispersion.

35. A process according to claim 34 in which the viscose solution is mixed with an aqueous dispersion of stearylamine-bis-dimethylene-triazinone-tetramethylol or stearylamide-bis-dimethylene-triazinone-tetramethylol containing a proportion of dispersed substance between 20 and 25 per cent by weight, based on the total weight of the dispersion.

36. A process according to claim 24 in which the liquid mixture contains a proportion of 0.5 to 40 per cent by weight, based on the weight of the cellulose component, of alkyl-trimethylol-urea and/or alkyl-ethylene-urea of the general formulae indicated in claim 1.

37. A process according to claim 36 in which the liquid mixture contains a proportion of 1 to 15 per cent by weight, based on the weight of the cellulose component, of alkyl-trimethylol-urea and/or alkyl-ethylene-urea.

38. A process according to claim 36 in which the liquid mixture contains a proportion of 0.5 to 40 per cent by weight, based on the weight of the cellulose component, of stearyl-trimethylol-urea and/or stearyl-ethylene-urea.

39. A process according to claim 37 in which the liquid mixture contains a proportion of 1 to 15 per cent by weight, based on the weight of the cellulose component, of stearyl-trimethylol-urea and/or stearyl-ethylene-urea.

40. A process according to claim 31 in which the liquid mixture contains a proportion of 0.5 to 40 per cent by weight, based on the weight of the cellulose component, of alkylamine-bis-dimethylene-triazinone-tetramethylol or alkylamide-bis-dimethylene-triazinone-tetramethylol of the general formulae indicated in claim 1.

41. A process according to claim 40 in which the liquid mixture contains a proportion of 1 to 15 per cent by weight, based on the weight of the cellulose component, of alkylamine-bis-dimethylene-triazinone-tetramethylol or alkylamide-bis-dimethylene-triazinone-tetramethylol.

42. A process according to claim 24 in which the liquid mixture contains a proportion of 0.5 to 40 per cent by weight, based on the weight of the cellulose component, of stearylamine-bis-dimethylene-triazinone-tetramethylol or stearylamide-bis-dimethylene-triazinone-tetramethylol.

43. A process according to claim 42 in which the liquid mixture contains a proportion of 1 to 15 per cent by weight, based on the weight of the cellulose component, of stearylamine-bis-dimethylene-triazinone-tetramethylol or stearylamide-bis-dimethylene-triazinone-tetramethylol.

* * * * *